(12) United States Patent
Albl et al.

(10) Patent No.: US 11,840,114 B2
(45) Date of Patent: Dec. 12, 2023

(54) WHEEL BEARING UNIT FOR A MOTOR VEHICLE AS WELL AS METHOD FOR PRODUCING A WHEEL BEARING UNIT

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 610 days.

(21) Appl. No.: 17/093,990

(22) Filed: Nov. 10, 2020

(65) Prior Publication Data
US 2021/0138834 A1   May 13, 2021

(30) Foreign Application Priority Data
Nov. 11, 2019 (DE) .......................... 102019130321.4

(51) Int. Cl.
| | |
|---|---|
| *B60B 27/00* | (2006.01) |
| *F16D 1/10* | (2006.01) |
| *B60B 27/06* | (2006.01) |
| *B23D 37/22* | (2006.01) |
| *B60B 27/02* | (2006.01) |

(52) U.S. Cl.
CPC ........ *B60B 27/0026* (2013.01); *B60B 27/065* (2013.01); *F16D 1/10* (2013.01); *B23D 37/22* (2013.01); *B60B 27/0094* (2013.01); *B60B 27/02* (2013.01); *F16D 2001/103* (2013.01)

(58) Field of Classification Search
CPC ............ B60B 27/0026; B60B 27/0094; B60B 27/065; F16D 1/10; F16D 2001/103; B23D 37/22
See application file for complete search history.

(56) References Cited

U.S. PATENT DOCUMENTS

| | | |
|---|---|---|
| 2005/0206223 A1 | 9/2005 | Im et al. |
| 2005/0223557 A1* | 10/2005 | Yasumura ........... B60B 27/0094 29/898.07 |

(Continued)

FOREIGN PATENT DOCUMENTS

| | | |
|---|---|---|
| DE | 10029100 A1 | 3/2001 |
| DE | 10338172 B3 | 6/2005 |

(Continued)

OTHER PUBLICATIONS

German Examination Report dated Nov. 12, 2021 in corresponding German Patent Application No. 10 2019 130 321.4; 13 pages.

(Continued)

*Primary Examiner* — Kip T Kotter
(74) *Attorney, Agent, or Firm* — Maier & Maier, PLLC

(57) ABSTRACT

A wheel bearing unit for a motor vehicle, having a wheel hub, a wheel bearing flange, and a wheel bearing for pivot mounting of the wheel hub on the wheel bearing flange. The wheel hub has a passage opening for mounting a shaft journal attached to the wheel hub by a screw connection element, and an inner toothing is formed, on an inner circumferential surface delimiting the passage opening, for rotationally fixed interaction with an outer toothing of the shaft journal, and the passage opening extends through a contact shoulder, which is formed so as to have contact with a contact surface of the screw connection element, with the formation of an orifice.

15 Claims, 1 Drawing Sheet

(56) References Cited

U.S. PATENT DOCUMENTS

2008/0242433 A1* 10/2008 Cermak .............. F16C 19/186
 464/178
2009/0245935 A1* 10/2009 Kamikawa .......... B60B 27/0042
 29/898.04

FOREIGN PATENT DOCUMENTS

| DE | 102004054907 A1 | | 9/2006 | |
|----|----|----|----|----|
| DE | 102006034039 A1 | | 1/2008 | |
| EP | 1308314 A2 | * | 5/2003 | ............. B60B 27/00 |
| JP | 2000266035 A | * | 9/2000 | |
| JP | 2001003947 A | * | 1/2001 | |
| JP | 2009234542 A | * | 10/2009 | ............. B60B 27/00 |

OTHER PUBLICATIONS

European Search Report dated Mar. 26, 2021, in connection with corresponding EP Application No. 20205928.3 (15 pp., including machine-generated English translation).

* cited by examiner

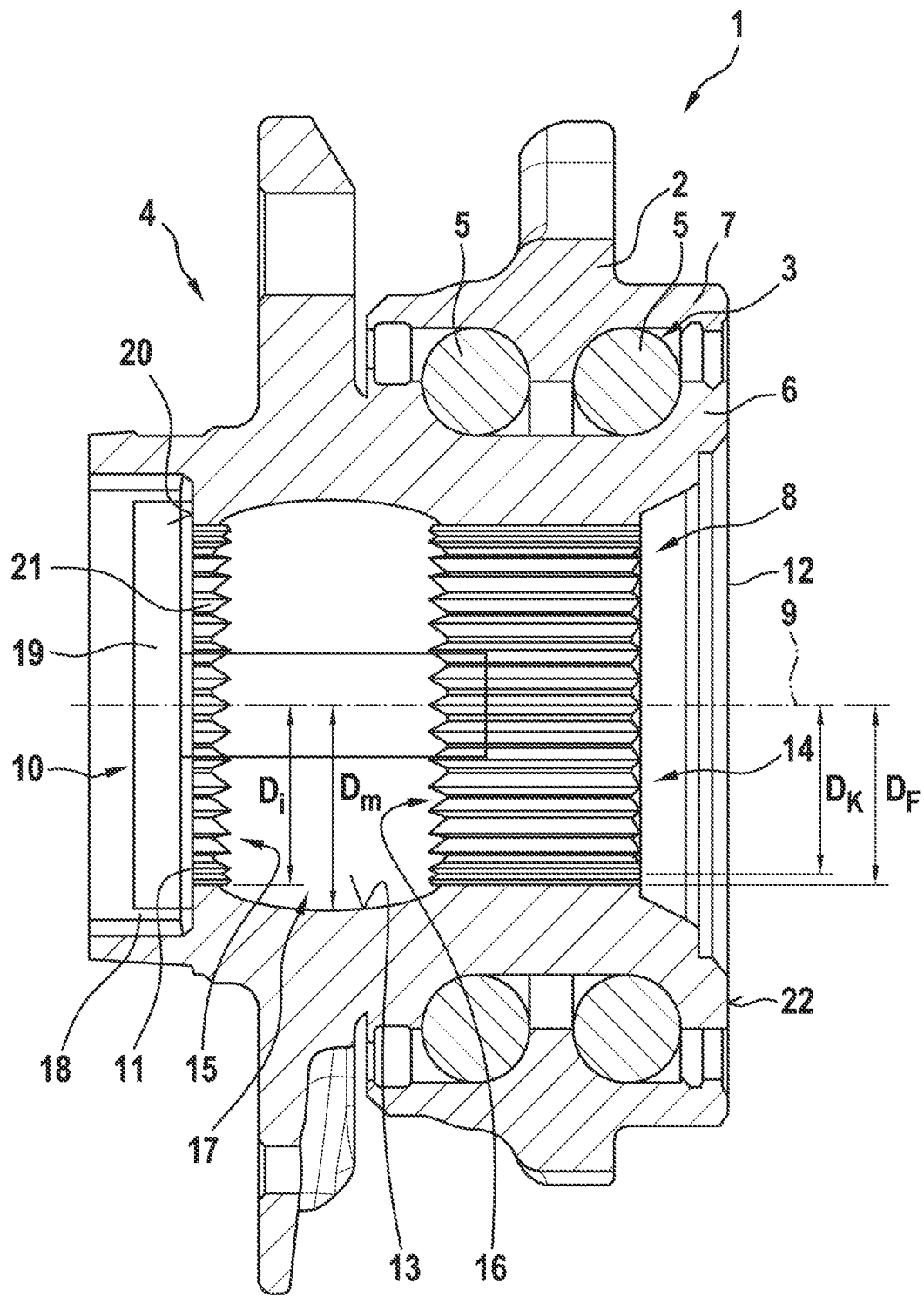

WHEEL BEARING UNIT FOR A MOTOR VEHICLE AS WELL AS METHOD FOR PRODUCING A WHEEL BEARING UNIT

FIELD

The invention relates to a wheel bearing unit for a motor vehicle, having a wheel hub, a wheel bearing flange, and a wheel bearing for pivot mounting of the wheel hub on the wheel bearing flange, wherein the wheel hub has a passage opening for mounting a shaft journal attached to the wheel hub by means of a screw connection element, and an inner toothing is formed, on an inner circumferential surface delimiting the passage opening, for rotationally fixed interaction with an outer toothing of the shaft journal, and wherein the passage opening extends through a contact shoulder, which is formed so as to have contact with a contact surface of the screw connection element, with the formation of an orifice. The invention further relates to a method for producing a wheel bearing unit.

BACKGROUND

Publication DE 103 38 172 B3, for example, is known from the prior art. This document describes a wheel hub/pivot joint assembly, which comprises a wheel hub with a wheel flange and a pivot joint, which can be connected to the wheel hub by means of a central screw/nut connection, for connecting a drive shaft. The wheel hub has a central passage with a flange-side opening having a smaller diameter and a joint-side opening having a larger diameter, wherein the flange-side opening is penetrated by a screw or a threaded pin of the screw/nut connection. An inner toothing is provided in the joint-side opening, in which inner toothing a journal of the pivot joint engages a corresponding outer toothing.

Furthermore, publication DE 10 2004 054 907 A1 discloses a wheel hub/constant-velocity rotary joint unit, in which a wheel hub with a passage opening, which supports inner shaft toothing, is tensioned with the outer joint part of a constant-velocity fixed joint, on which a journal with outer shaft toothing is molded, wherein inner shaft toothing of the passage opening and outer shaft toothing of the journal engage one another, and a double-row wheel bearing is pushed onto the wheel hub, which comprises an inner bearing ring, on which an end surface of the outer joint part directly rests, wherein half of the total of the pitch diameter of the pivot balls and the bearing width is greater than the center-to-center distance between the constant-velocity rotary joint and the wheel bearing.

SUMMARY

The object of the invention is to propose a wheel bearing unit for a motor vehicle which has advantages over known wheel bearing units, particularly which enables a simple and economical production with simultaneously extremely low weight of the wheel bearing unit.

This is achieved according to the invention with a wheel bearing unit for a motor vehicle. It is provided in this case that, in order to enlarge the contact shoulder, the inner toothing is formed on the inner circumferential surface up to the orifice such that an inner diameter of the orifice corresponds to at least a tip diameter of the inner toothing and less than a root diameter of the inner toothing, and such that the inner toothing has a first toothing region present in the orifice and a second toothing region spaced apart from the first toothing region in the axial direction as relates to a center longitudinal axis of the passage opening, between which toothing regions a section of the passage opening is formed with an inner diameter which is greater than the tip diameter of the inner toothing.

The wheel bearing unit is preferably a component of a wheel suspension. The wheel suspension is used to connect a wheel to a body of the motor vehicle. To this end, the wheel suspension is preferably a component of the motor vehicle. The wheel suspension is preferably provided and formed for suspension, particularly for spring-loaded suspension of the wheel as relates to the body. The wheel is rotatably mounted or at least can be mounted on a wheel carrier of the wheel suspension. To this end, the wheel is attached or can be attached to the wheel hub, which is ultimately rotatably mounted on the wheel carrier, namely by means of the wheel bearing. The wheel bearing unit in this case is attached to the wheel carrier or affixed thereto via its wheel bearing flange. The wheel hub may be a component of the wheel bearing and/or integrally formed therewith. For example, to this end, the wheel hub is designed with the inner ring or the outer ring of the wheel bearing as a single piece and/or with uniform material, while the other respective ring, i.e. either the outer ring or the inner ring, is attached to the wheel bearing flange or is designed, in turn, with it as a single piece and/or with uniform material.

The wheel bearing flange has, for example, a wheel bearing mount, which is designed as an opening, particularly as an opening closed at the edge, in the wheel bearing flange. The wheel bearing is arranged, at least in regions, in the wheel bearing mount. In addition, the wheel hub and/or a shaft journal rotatably coupled thereto engages the wheel bearing mount, at least in regions. Especially preferably, the wheel hub and/or the shaft journal engage, preferably jointly, the wheel bearing mount in the axial direction as relates to the axis of rotation of the wheel hub, at least partially, particularly completely.

The shaft journal is used to drive the wheel hub, namely to rotatably drive the wheel hub as relates to the wheel bearing flange and consequently as relates to the wheel carrier. To this end, the shaft journal and the wheel hub are coupled in a rotationally fixed manner. For example, the shaft journal is a component of a pivot joint, by means of which a drive shaft is connected to the wheel hub in a rotationally fixed manner. The pivot joint enables a pivoting and/or tilting of the drive shaft as relates to the wheel hub to the extent that a compensatory movement is enabled which occurs, for example, upon a deflection of the wheel as relates to the body. The shaft journal of the pivot joint engages the wheel hub, in the manner of a journal, and is coupled thereto in a rotationally fixed manner by means of toothing.

The wheel bearing has the inner ring and outer ring which are arranged rotatably as relates to one another. The inner ring is preferably allocated to the wheel hub, particularly connected to the wheel hub, for example the inner ring is designed with the wheel hub as a single piece or is attached thereto, while the outer ring is allocated to the wheel bearing flange and accordingly the wheel carrier, for example is connected to the wheel carrier via the wheel bearing flange, for example is attached thereto. In this case, the outer ring is preferably situated in the wheel bearing mount. In other words, the outer circumferential surface of the outer ring fits closely with an inner circumferential surface of the wheel bearing flange delimiting the wheel bearing mount. Of course, the reverse design may also be implemented, in which the inner ring is connected to the wheel bearing flange in a rotationally fixed manner, and the outer ring is connected to the wheel hub in a rotationally fixed manner Especially preferably, the wheel bearing is formed as a roller bearing and has, in this respect, roller elements which are arranged between the inner ring and the outer ring for reducing friction.

The wheel carrier, which is preferably not a component of the wheel bearing unit, is preferably connected to the body via at least one chassis link. Thus, the chassis link engages, on the one hand, the body and, on the other hand, the wheel carrier, particularly in a pivotable manner in each case. The chassis link is present, for example, in the form of a transverse control arm. However, a design as a longitudinal control arm is also possible. Essentially, the wheel carrier is connected to the body via at least one chassis link. However, several chassis links are preferably provided for the connection of the wheel carrier to the body. For example, at least one of the chassis links, several of the chassis links, or all of the chassis links are respectively provided in the form of a two-point control arm. The wheel bearing flange is then connected to the wheel carrier and attached thereto, particularly rigidly.

The rotationally fixed coupling of the shaft journal to the wheel hub is achieved by means of the interaction between the inner toothing of the wheel hub and the outer toothing of the shaft journal. The inner toothing is formed on the inner circumferential surface, which delimits the passage opening of the wheel hub outwardly in the radial direction, namely as relates to the center longitudinal axis of the passage opening, which additionally corresponds to the axis of rotation of the wheel hub as relates to the wheel bearing flange. The shaft journal engages the passage opening and is fixed in said passage opening in the axial direction by means of the screw connection element.

The screw connection element is present, for example, in the form of a screw or a nut. The screw interacts with the shaft journal in order to fix the shaft journal in the axial direction, particularly the screw engages the shaft journal. On the other hand, a screw head of the screw fits closely with a contact surface formed thereon, on the side of the screw facing away from the shaft journal, on the contact shoulder of the wheel hub. The screw hereby retains the shaft journal in the wheel hub in at least one direction and prevents the shaft journal from moving out of the passage opening into the direction facing away from the contact shoulder.

If the screw connection element is in the form of a nut, the shaft journal thus protrudes from the passage opening, namely on its side facing the contact shoulder. The nut is screwed onto the shaft journal such that the contact surface formed on the nut rests against the contact shoulder of the wheel hub. The nut hereby retains the shaft journal in the wheel hub in at least one direction and prevents the shaft journal from moving out of the passage opening into the direction facing away from the contact shoulder.

The passage opening extends completely through the wheel hub in the axial direction. Accordingly, it extends through the contact shoulder in the axial direction with the formation of an orifice. It should be particularly understood here that the orifice lies completely in an imaginary plane which additionally includes the entire contact shoulder. This imaginary plane is situated preferably perpendicular on the center longitudinal axis of the passage opening. It should be noted that the wheel bearing unit preferably only has the wheel bearing flange, the wheel hub, and the wheel bearing. Further elements are not necessarily a component of the wheel bearing unit. Thus, the shaft journal as well as the screw connection element are merely optionally a component of the wheel bearing flange and do not necessarily have to be included therewith.

In order to enable an especially simple and economical production of the wheel bearing unit and particularly of the wheel hub, the inner toothing on the inner circumferential surface should extend up to the orifice. This means that the contact shoulder for the contact surface of the screw connection element is formed, at least partially, by teeth of the inner toothing. This has the advantage that the size of the contact surface is maximized with a simultaneously low weight of the wheel hub and that the formation of the inner toothing can take place very cost-efficiently, for example by means of broaching. In order to form the inner toothing, a broaching tool is guided through the passage opening such that the inner toothing is created through machining and/or through material erosion of the material of the wheel hub.

In order to form the inner toothing, the broaching tool is moved through the entire passage opening, i.e. particularly also through the orifice. However, in order to achieve a sufficiently large contact shoulder, the inner toothing should also be present in the region of the orifice so that, in the end, the teeth of the inner toothing form, at least partially, the contact shoulder and consequently serve to support the contact shoulder and/or the screw connection element. This means that the inner diameter of the orifice, i.e. the smallest diameter of the orifice, corresponds to or is greater than at least the tip diameter of the inner toothing, over the entire circumference. At the same time, the inner diameter of the orifice is less than the root diameter of the inner toothing.

Essentially, it may be provided that the inner toothing is to be formed on the inner circumferential surface, over the entire extension of the passage opening in the axial direction. However, this is associated with rapid wear of the tool used to produce the inner toothing, particularly the broaching tool. For this reason, it is then provided that the inner toothing is composed of several toothing regions spaced apart from one another, namely composed at least of the first toothing region and the second toothing region.

The first toothing region is situated in the orifice and/or extends in the axial direction up to and inside the orifice. In other words, the teeth at least partially forming the contact shoulder are assigned to the first toothing region. The second toothing region is situated spaced apart from the first toothing region in the axial direction. Preferably, the outer toothing of the shaft journal exclusively engages the second toothing region of the inner toothing, but not the first toothing region. The second toothing region is dimensioned and designed in this regard such that it is sufficient for an exclusive torque transfer between the shaft journal and the wheel hub.

Essentially, the inner toothing in the first toothing region is designed identically to the second toothing region. However, because the shaft journal is spaced apart from the first toothing region and does not extend thereto, the inner diameter of the orifice does not necessarily have to correspond to the tip diameter of the inner toothing but may even be greater. In the end, this means that the inner toothing in the first toothing region and the second toothing region have the same root diameter, the same base diameter, and the same pitch diameter. However, the tip diameter may be selected larger in the first toothing region than in the second toothing region such that, in other words, the inner diameter of the orifice corresponds to or is greater than at least the tip diameter of the inner toothing in the second toothing region.

The section of the passage opening is positioned between the first toothing region and the second toothing region. This means that the two toothing regions are situated on opposite sides of the section, as seen in the axial direction, i.e. on one side of the section of the first toothing region and on the other side of the section of the second toothing region. The passage opening has an inner diameter in the section which is greater than the tip diameter of the inner toothing. Thus, the inner toothing does not lie in the section or does so with an enlarged tip diameter.

On the one hand, this is used for weight reduction of the wheel hub, because unneeded material is removed from the wheel hub in the section of the passage opening. On the other hand, production of the inner toothing can take place in a manner which is especially gentle for the tool, provided the inner diameter, which is enlarged as compared to the tip diameter of the inner toothing, is formed before production of the inner toothing. For example, machining of the wheel hub to remove material takes place in the section in order to enlarge the diameter of the passage opening such that the inner diameter is greater than the tip diameter of the inner toothing formed subsequently. In the subsequent production of the inner toothing, the inner toothing is not formed, or only partially in any case, due to the enlarged inner diameter of the section such that the load on the tool is reduced significantly.

One refinement of the invention provides that the inner diameter in the section of the passage opening corresponds, at least in regions, to at least the root diameter such that the inner toothing is interrupted in the section. The inner diameter is greater than the tip diameter of the inner toothing over the entire extension of the section in the axial direction. However, it is selected, at least in sections, such that the inner toothing is completely interrupted, i.e. teeth of the inner toothing are not even rudimentarily situated in the section. In order to achieve this, the inner diameter is selected to be correspondingly large enough, namely to correspond at least to the root diameter or to be even greater than the root diameter. This ensures production of the inner toothing which is particularly gentle for the tool, and there is an especially significant weight reduction in the wheel hub.

When the tip diameter or the root diameter of the inner toothing are mentioned in this description, this always refers to the tip diameter and/or the root diameter in the second toothing region of the inner toothing, provided there is nothing mentioned to the contrary.

One refinement of the invention provides that the inner diameter in the section enlarges up to the maximum diameter starting from the first toothing region, particularly continually, and then subsequently reduces up to the second toothing region, particularly continually. Preferably, the inner diameter of the section corresponds to the tip diameter thereof on sides of the first toothing region and, on the other side, corresponds to the tip diameter thereof on sides of the second toothing region.

In any case, the inner diameter of the section changes over its extension in the axial direction. Thus, it is initially greater starting from the first toothing region in the direction of the second toothing region, until it reaches the maximum diameter. It gets smaller again starting from the maximum diameter, namely further in the direction of the second toothing region. In other words, the inner diameter enlarges starting from the first toothing region and the second toothing region, respectively, up to the maximum diameter; the maximum diameter in this case is to be understood as the largest inner diameter of the section over its entire extension in the axial direction.

The enlargement of the inner diameter preferably occurs continually, i.e. without any interim reduction. Especially preferably, the inner diameter additionally increases continually, i.e. without interruption. The reducing of the inner diameter also preferably takes place continually and/or steadily. Any impact on the strength of the wheel hub is hereby reliably prevented by means of the enlarged inner diameter.

One refinement of the invention provides that the section has an extension in the axial direction which corresponds to or is greater than or less than an extension of the second toothing region in the same direction, and/or that the first toothing region has an extension in the axial direction which is less than the extension of the second toothing region or the section in the same direction. As seen in the longitudinal section as relates to the center longitudinal axis of the passage opening, the section is thus at least as long in the axial direction as the second toothing region or is less than this, wherein the latter is preferred. An especially effective reduction in the weight of the wheel hub is hereby realized.

Additionally or alternatively, the extension of the first toothing region is less than the extension of the second toothing region or less than the axial extension of the section. Because the first toothing region is only used for providing the contact shoulder, it can be designed with a comparatively small extension in the axial direction and still fulfill the strength requirements placed upon it. For example, the extension of the first toothing region in the axial direction is no more than 25%, no more than 20%, no more than 15%, or no more than 10% of the extension of the second toothing region in the axial direction. This is also used to realize a low weight of the wheel hub.

One refinement of the invention provides that the shaft journal engages the passage opening by means of a further orifice facing away from the orifice in the axial direction and ends either spaced apart from the orifice or extends completely through the passage opening and protrudes through the orifice from the passage opening. The passage opening extends, in the longitudinal section, starting from the orifice up to the further orifice and is delimited thereby in opposite directions. Thus, the orifice lies on one side of the passage opening and the further orifice lies on the other side of the passage opening. The orifice is encompassed by the context shoulder in the circumferential direction, preferably continually in the circumferential direction. To this end, the contact shoulder is designed in the shape of a ring and further preferably lies completely in the imaginary plane in which the orifice is also completely enclosed.

Via the orifice, the passage opening extends, for example, into a screw connection mount of the wheel hub, which has a larger diameter than the passage opening. Preferably, the diameter of the screw connection mount is greater than the maximum inner diameter of the passage opening over its entire extension in the axial direction. The screw connection mount is used to mount a screw head of the screw or to mount the nut.

The passage opening is delimited by the further orifice on the side of the orifice facing away from the screw connection mount. By means of this further orifice, the shaft journal extends into the passage opening, namely such that it is spaced apart from the orifice—in the event it is attached by means of the screw. In other words, the shaft journal extends into the passage opening in the axial direction only partially, for example only up to the section of the passage opening. In contrast, the screw extends through the orifice into the passage opening. In contrast, if the shaft journal is attached to the nut, it extends through the further orifice into the passage opening and through it completely, i.e. it protrudes from the passage opening through the orifice. The nut engages the shaft journal outside of the passage opening. The described embodiment enables an especially compact design of the wheel hub.

The outer toothing of the shaft journal is situated in the second toothing region, as seen in the axial direction, but ends before the first toothing region. It may be provided in this case that the outer toothing extends only partially through the second toothing region in the axial direction and ends therein. It may also be provided that the outer toothing ends with the second toothing region or in the section. Thus, the outer toothing extends in the axial direction only over a part of the shaft journal or ends spaced apart from a free end of the shaft journal.

One refinement of the invention provides that the shaft journal engages the second toothing region completely and protrudes into the section of the passage opening but ends spaced apart from the first toothing region. Reference has previously been made thereto. This embodiment enables an especially effective transmission of torque between the shaft journal and the wheel hub because the entire extension of the second toothing region in the axial direction is utilized.

One refinement of the invention provides that the further orifice lies completely within an imaginary plane which is perpendicular to the center longitudinal axis, wherein the imaginary plane completely encompasses a contact surface for a coupling device having a shaft journal and is arranged spaced apart from the second toothing region in the axial direction. The coupling device is used particularly for the rotationally fixed connection of the wheel hub to the previously mentioned drive shaft. The coupling device may be present, for example, in the form of the pivot bearing. The shaft journal in this case is a component of the coupling device.

The coupling device is fixed in position in the axial direction as relates to the wheel hub by means of the screw connection element. To this end, the coupling device fits closely with the contact surface, on one side, and is pushed up against said contact surface by the screw connection element. On the other side, the screw connection element fits closely with the contact shoulder with its contact surface such that, in the end, the wheel hub is retained between the coupling device and the screw connection element, in a clamping manner. In addition, the coupling device is fixed in the circumferential direction as relates to the wheel hub due to the interaction of the inner toothing with the outer toothing.

The contact surface lies in the imaginary plane, in which the further orifice is also arranged. This imaginary plane is additionally situated perpendicular on the center longitudinal axis. An especially low weight is realized due to the merely partial extension of the passage opening through the coupling device and/or its shaft journal with a simultaneously sufficient transmission of torque.

The invention further relates to a method for producing a wheel bearing unit for a motor vehicle, particularly a wheel bearing unit according to the statements within the scope of this description, wherein the wheel bearing unit has a wheel hub, a wheel bearing flange, and a wheel bearing for pivot mounting of the wheel hub on the wheel bearing flange, wherein the wheel hub has a passage opening for mounting a shaft journal attached to the wheel hub by means of a screw connection element, and an inner toothing is formed, on an inner circumferential surface delimiting the passage opening, for rotationally fixed interaction with an outer toothing of the shaft journal, and wherein the passage opening extends through a contact shoulder, which is formed so as to have contact with a contact surface of the screw connection element, with the formation of an orifice.

It is provided in this case that, in order to enlarge the contact shoulder, the inner toothing is formed on the inner circumferential surface up to the orifice such that an inner diameter of the orifice corresponds to at least a tip diameter of the inner toothing and is less than a root diameter of the inner toothing, and such that the inner toothing has a first toothing region present in the orifice and a second toothing region spaced apart from the first toothing region in the axial direction as relates to a center longitudinal axis of the passage opening, between which toothing regions a section of the passage opening is formed with an inner diameter which is greater than the tip diameter of the inner toothing.

Reference has already been made to the advantages of such type of procedure and/or such type of embodiment of the wheel bearing unit. Both the wheel bearing unit as well as the method for the production thereof may be further refined according to the statements within the scope of this description, to the extent that reference is made thereto.

One refinement of the invention provides that the inner toothing is formed from broaching, wherein a broaching tool extends completely through the passage opening. The broaching enables an especially economical production of the inner toothing, because only the broaching tool has to be moved through the orifice after the formation thereof in order to completely form the inner toothing. For example, a broaching needle or a broaching spike is used as the broaching tool. Especially preferably, the broaching tool is a one-part broaching tool such that, after the broaching tool is guided through the passage opening, particularly after the one-time passing of the broaching tool through the passage opening, the inner toothing is completely formed and consequently present in its final form.

One refinement of the invention provides that the section is provided, before the broaching, with the inner diameter, which is greater than the tip diameter of the inner toothing, particularly lies between the tip diameter and a root diameter of the inner toothing, corresponds precisely to the root diameter, or is greater than the root diameter. Preferably, this takes place through machining of the wheel hub so as to remove material, particularly through milling, turning, or the like. The production of the larger inner diameter before the broaching leads to less strain on the broaching tool during the production of the inner toothing. Especially preferably, the section is provided with an inner diameter, at least in regions, which corresponds to or is greater than at least the root diameter of the inner toothing. This means that the inner toothing is not formed in the section, even rudimentarily, at least in regions. An especially low stress on the broaching tool is hereby realized.

BRIEF DESCRIPTION

The invention is explained in more detail in the following by means of exemplary embodiments, without limiting the invention. In doing so, the only FIGURE shows a schematic representation of a wheel bearing unit for a motor vehicle.

DETAILED DESCRIPTION

The FIGURE shows a schematic longitudinal section of a wheel bearing unit 1 for a motor vehicle. The wheel bearing unit 1 has a wheel bearing flange 2, on which a wheel hub 4 is rotatably mounted via a wheel bearing 3. A wheel of the motor vehicle can ultimately be attached to the wheel hub 4 such that, after its assembly, the wheel is rotatably mounted as relates to the wheel bearing flange 2 by means of a body of the motor vehicle. The wheel bearing 3 is formed as a roller bearing and has, in this respect, roller elements 5 which are arranged between an inner ring 6 and an outer ring 7 of the wheel bearing 3. In the exemplary embodiment shown here, the inner ring 6 is designed with the wheel hub 4 as a single piece and with uniform material, and the outer ring 7 is designed with the wheel bearing flange 2 as a single piece and with uniform material. Of course, the inner ring 6 and the outer ring 7—optionally in each case—may also be in the form of separate elements which are arranged on and/or attached to the wheel hub 4 and/or the wheel bearing flange 2.

The wheel hub 4 has a passage opening 8, in which a screw connection element formed as a screw 10 and, on the other side, a shaft journal, which is not shown here, of the coupling device engage in the axial direction as relates to a center longitudinal axis 9 of the passage opening 8. The screw 10 is used to affix the shaft journal in the passage opening 8. Alternatively, the screw connection element may be formed as a nut for this. The screw 10 extends through an orifice 11 of the passage opening 8, and the shaft journal extends through a further orifice 12. Orifices 11 and 12 delimit the passage opening 8 in the axial direction. The passage opening 8 is delimited outwardly on opposite sides in the radial direction by an inner circumferential surface 13.

An inner toothing 14 is formed on the inner circumferential surface 13, which inner toothing is provided and formed to interact with an outer toothing of the shaft journal in a rotationally fixed manner. The inner toothing 14 is formed at least in a first toothing region 15 and a second toothing region 16 which are spaced apart from one another in the axial direction as relates to the center longitudinal axis 9. As seen in the axial direction, a section 17 of the passage opening 8 is situated between toothing regions 15 and 16.

A screw connection mount 18, which is used as a mount of a screw head 19 of the screw 10, is situated on the side of the orifice 11 facing away from the passage opening 8. After assembly of the wheel bearing unit 1, the screw head 19 is situated on a contact shoulder 20, which encompasses the orifice 11 in the circumferential direction at least partially, but preferably completely. The contact shoulder 20 is preferably continually planar and situated completely in an imaginary plane which also completely encompasses the orifice 11.

The contact shoulder 20 is formed, at least in regions, by teeth 21 of the inner toothing 14 of the first toothing region 15. To this end, the inner toothing 14 extends up to the orifice 11.

This means that the contact shoulder 20 encompasses the orifice 11 in the manner of a ring. On the side of the wheel hub 4 opposite the contact shoulder 20, a contact surface 22 fits closely therewith, which contact surface serves to support the coupling device, which is not shown, in the axial direction. After assembly of the wheel bearing unit 1, the screw head 19 fits closely with the contact shoulder 20, and the coupling device fits closely with the contact surface 22, while the screw 10 simultaneously engages a shaft journal of the coupling device in a fixing manner, which shaft journal protrudes through the further orifice 12 into the passage opening 8. In this respect, the shaft journal and/or the coupling device is securely affixed to the wheel hub 4 in the axial direction by means of the screw 10. In addition, the shaft journal and the wheel hub 4 are established against each other due to the interaction of the inner toothing 14 with the outer toothing of the shaft journal.

In order to achieve an especially economical production of the wheel bearing unit 1 and particularly the wheel hub 4, the inner toothing 14 should be formed by means of broaching, wherein a broaching tool is guided through the passage opening 8. This means that the orifice 11 must have a correspondingly large diameter. In order to still achieve sufficient fatigue strength of the wheel bearing unit 1, the contact shoulder 20—as previously mentioned—should be formed, at least partially, by the teeth 21 of the inner toothing 14 of the first toothing region 15. This means that an inner diameter $D_i$ of the passage opening 8 in the first toothing region 15 corresponds at least to a tip diameter $D_K$ of the inner toothing 14 and is less than a root diameter $D_F$ of the inner toothing 14. In other words, the following holds true: $D_K \leq D_i < D_F$.

In order to achieve an especially low strain on the broaching tool and additionally to design the wheel bearing unit 1 to be as lightweight as possible, it is additionally provided that the passage opening 8 in the section 17 has an inner diameter which is greater than the tip diameter $D_K$ of the inner toothing 14. Preferably, it is provided that the inner diameter of the section 17 enlarges starting from the first toothing region 15 up to a maximum diameter $D_m$ and subsequently reduces again up to the second toothing region 16. The maximum diameter $D_m$ in this case is at least greater than the tip diameter $D_K$ of the inner toothing 14; however, it especially preferably corresponds at least to the root diameter $D_F$. The latter case means that the inner toothing 14 in the section 17 is not even rudimentarily formed to the extent that the inner toothing 14 in the section 17 is interrupted, at least in regions.

The described embodiment of the wheel bearing unit 1 enables an especially economical and simple design, on the one hand, and has an especially low weight, on the other hand.

LIST OF REFERENCE NUMERALS

1 Wheel bearing unit
2 Wheel bearing flange
3 Wheel bearing
4 Wheel hub
5 Roller element
6 Inner ring
7 Outer ring
8 Passage opening
9 Center longitudinal axis
10 Screw
11 Orifice
12 Orifice
13 Inner circumferential surface
14 Inner toothing
15 1st toothing region
16 2nd toothing region
17 Section
18 Screw connection mount
19 Screw head
20 Contact shoulder
21 Teeth
22 Contact surface

The invention claimed is:

1. A wheel bearing unit for a motor vehicle, comprising: a wheel hub, a wheel bearing flange, and a wheel bearing for pivot mounting of the wheel hub on the wheel bearing flange, wherein the wheel hub has a passage opening for mounting a shaft journal attached to the wheel hub by a screw connection element, and an inner toothing is formed, on an inner circumferential surface delimiting the passage opening, for rotationally fixed interaction with an outer toothing of the shaft journal, and wherein the passage opening extends through a contact shoulder, which is formed so as to have contact with a contact surface of the screw connection element, with the formation of an orifice, wherein in order to enlarge the contact shoulder, the inner toothing is formed on the inner circumferential surface up to the orifice such that an inner diameter corresponds to at least a tip diameter of the inner toothing and is less than a root diameter of the inner toothing, and wherein the inner toothing has a first toothing region present in the orifice and a second toothing region spaced apart from the first toothing region in the axial direction as relates to a center longitudinal axis of the passage opening, between which toothing regions a section of the passage opening is formed with an inner diameter which is greater than the tip diameter of the inner toothing, wherein the shaft journal engages the second toothing region completely and protrudes into the section of the passage opening, but ends spaced apart from the first toothing region.

2. The wheel bearing unit according to claim 1, wherein the inner diameter in the section of the passage opening corresponds, at least in regions, to at least the root diameter such that the inner toothing is interrupted in the section.

3. The wheel bearing unit according to claim 2, wherein the inner diameter of the section enlarges starting from the first toothing region up to a maximum diameter and subsequently reduces up to the second toothing region.

4. The wheel bearing unit according to claim 2, wherein the section has an extension in the axial direction which corresponds to or is greater than or less than an extension of the second toothing region in the same direction, and/or wherein the first toothing region has an extension in the axial direction which is less than the extension of the second toothing region or the section in the same direction.

5. The wheel bearing unit according to claim 2, wherein the shaft journal engages the passage opening by a further orifice facing away from the orifice in the axial direction and ends either spaced apart from the orifice or extends completely through the passage opening and protrudes through the orifice from the passage opening.

6. The wheel bearing unit according to claim 1, wherein the inner diameter of the section enlarges starting from the first toothing region up to a maximum diameter and subsequently reduces up to the second toothing region.

7. The wheel bearing unit according to claim 6, wherein the section has an extension in the axial direction which corresponds to or is greater than or less than an extension of the second toothing region in the same direction, and/or wherein the first toothing region has an extension in the axial direction which is less than the extension of the second toothing region or the section in the same direction.

8. The wheel bearing unit according to claim 6, wherein the shaft journal engages the passage opening by a further orifice facing away from the orifice in the axial direction and ends either spaced apart from the orifice or extends completely through the passage opening and protrudes through the orifice from the passage opening.

9. The wheel bearing unit according to claim 1, wherein the section has an extension in the axial direction which corresponds to or is greater than or less than an extension of the second toothing region in the same direction, and/or wherein the first toothing region has an extension in the axial direction which is less than the extension of the second toothing region or the section in the same direction.

10. The wheel bearing unit according to claim 9, wherein the shaft journal engages the passage opening by a further orifice facing away from the orifice in the axial direction and ends either spaced apart from the orifice or extends completely through the passage opening and protrudes through the orifice from the passage opening.

11. The wheel bearing unit according to claim 1, wherein the shaft journal engages the passage opening by a further orifice facing away from the orifice in the axial direction and ends either spaced apart from the orifice or extends completely through the passage opening and protrudes through the orifice from the passage opening.

12. The wheel bearing unit according to claim 1, wherein the further orifice lies completely within an imaginary plane which is perpendicular to the center longitudinal axis, wherein the imaginary plane completely encompasses a contact surface for a coupling device having a shaft journal and is arranged spaced apart from the second toothing region in the axial direction.

13. A method for producing a wheel bearing unit for a motor vehicle, wherein the wheel bearing unit has a wheel hub, a wheel bearing flange, and a wheel bearing for pivot mounting of the wheel hub on the wheel bearing flange, wherein the wheel hub has a passage opening for mounting a shaft journal attached to the wheel hub by a screw connection element, and an inner toothing is formed, on an inner circumferential surface delimiting the passage opening, for rotationally fixed interaction with an outer toothing of the shaft journal, and wherein the passage opening extends through a contact shoulder, which is formed so as to have contact with a contact surface of the screw connection element, with the formation of an orifice, wherein in order to enlarge the contact shoulder, the inner toothing is formed on the inner circumferential surface up to the orifice such that an inner diameter of the orifice corresponds to at least a tip diameter of the inner toothing and is less than a root diameter of the inner toothing, and wherein the inner toothing has a first toothing region present in the orifice and a second toothing region spaced apart from the first toothing region in the axial direction as relates to a center longitudinal axis of the passage opening, between which toothing regions a section of the passage opening is formed with an inner diameter which is greater than the tip diameter of the inner toothing, wherein the shaft journal engages the second toothing region completely and protrudes into the section of the passage opening, but ends spaced apart from the first toothing region.

14. The method according to claim 13, wherein the inner toothing is formed from broaching, wherein a broaching tool extends completely through the passage opening.

15. The method according to claim 13, wherein the section is provided, before the broaching, with the inner diameter which is greater than the tip diameter of the inner toothing.

* * * * *